July 10, 1934.　　　　F. S. DURHAM　　　　1,966,403
WELDING UNION
Filed March 5, 1931　　　4 Sheets-Sheet 2.

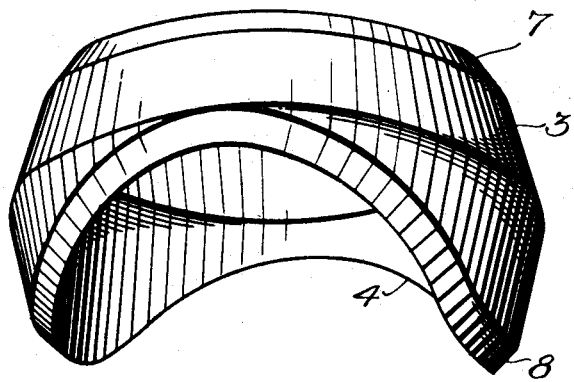
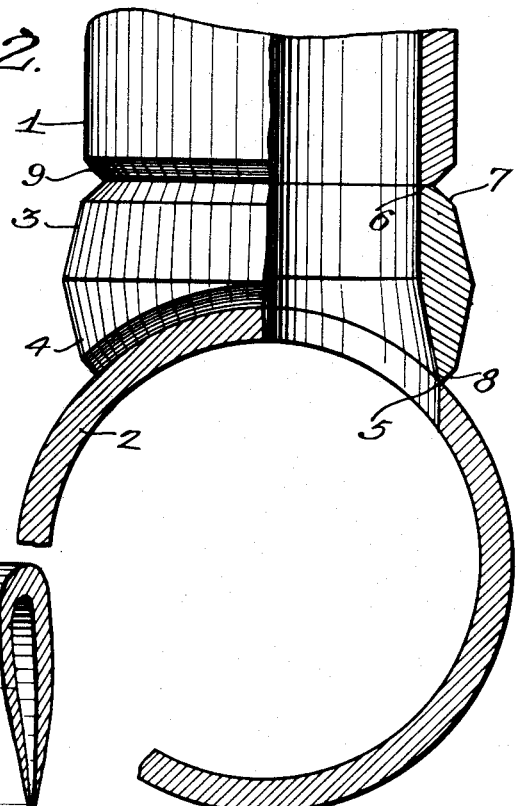
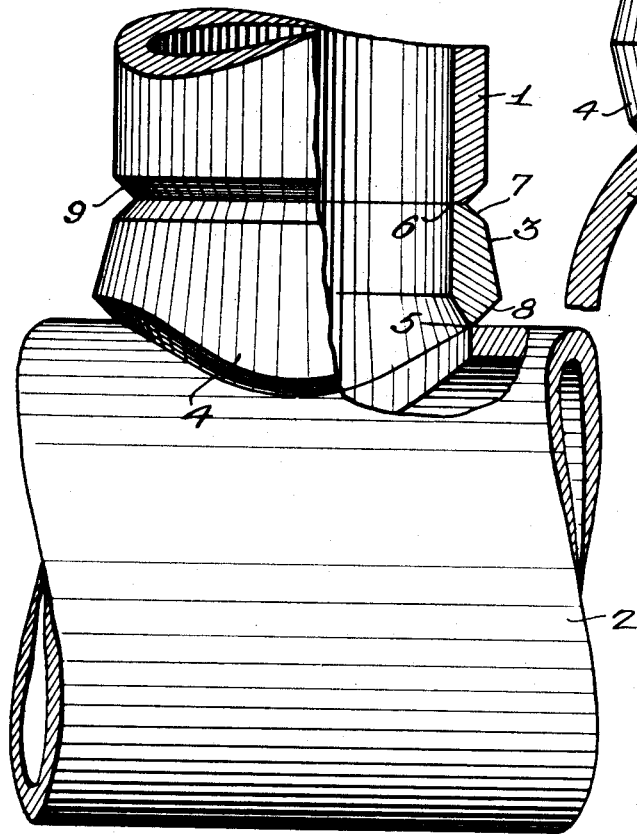

Inventor:—
Fred S. Durham
by his Attorneys
Howson & Howson

July 10, 1934.　　　　F. S. DURHAM　　　　1,966,403
WELDING UNION
Filed March 5, 1931　　　4 Sheets-Sheet 3

Inventor:-
Fred S. Durham
by his Attorneys
Howson & Howson

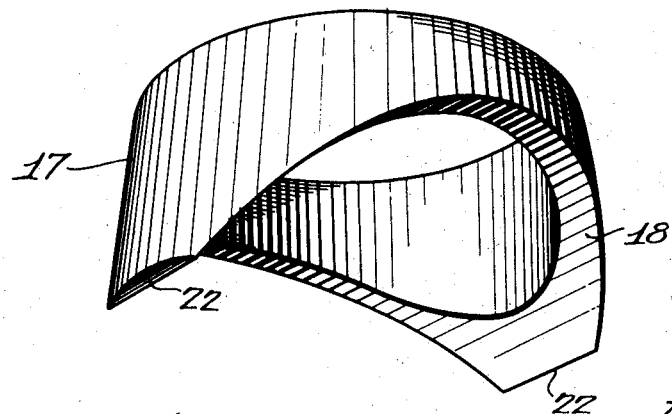
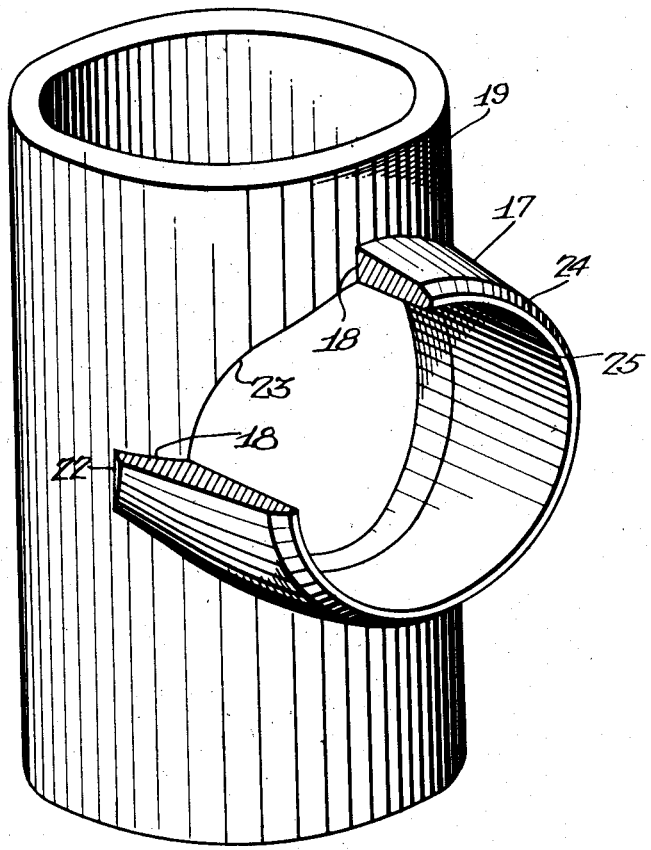
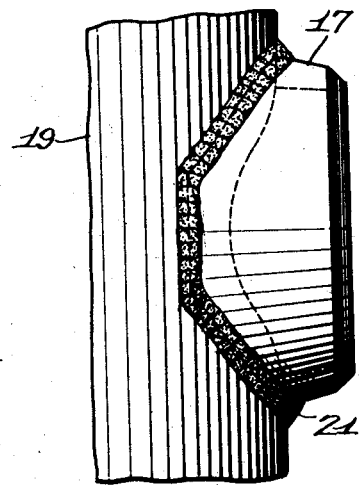

Patented July 10, 1934

1,966,403

UNITED STATES PATENT OFFICE 1,966,403

WELDING UNION

Fred S. Durham, Catasauqua, Pa., assignor to Nassau Products, Allentown, Pa., a corporation of Pennsylvania Application March 5, 1931, Serial No. 520,346

4 Claims. (Cl. 285—106)

This invention relates primarily to improvements in methods and means for uniting pipes, tubes and the like by welding, although it may in principle find useful application outside of this immediate field.

A principal object of the invention is to provide improved means for uniting the end of one tube or pipe to the side of another, said means materially simplifying the welding operation and resulting in a generally improved connection.

Another object of the invention is to provide means of the stated character affording a more uniform and stronger joint than was obtainable by the prior practices.

Still another object of the invention is to provide means of the stated character materially reducing the cost of the welding operation.

The invention further contemplates the provision of standardized fittings of novel form available for all sizes of pipe and adapted as hereinafter set forth to materially facilitate the union of said pipes by welding.

Another object of the invention is to provide a device of the stated character adapted for uniting pipes of the same or differing sizes without loss of capacity due to restriction at the point of juncture.

The foregoing and other desirable ends I accomplish by means hereinafter described and illustrated in the attached drawings, in which:

Figure 1 is a view in perspective of a welding union made in accordance with my invention;

Fig. 2 is an end elevational view of the welding union positioned in assembly with two pipes to be connected to afford a branch but prior to the welding operation;

Fig. 3 is a side elevational view of the assembly illustrated in Fig. 2;

Fig. 9 is a view in perspective of a further embodiment of my invention;

Fig. 10 is a view, partly in section, illustrating the manner of applying the fitting shown in Fig. 9, and Fig. 11 is a side view of the welded assembly.

Figure 4:
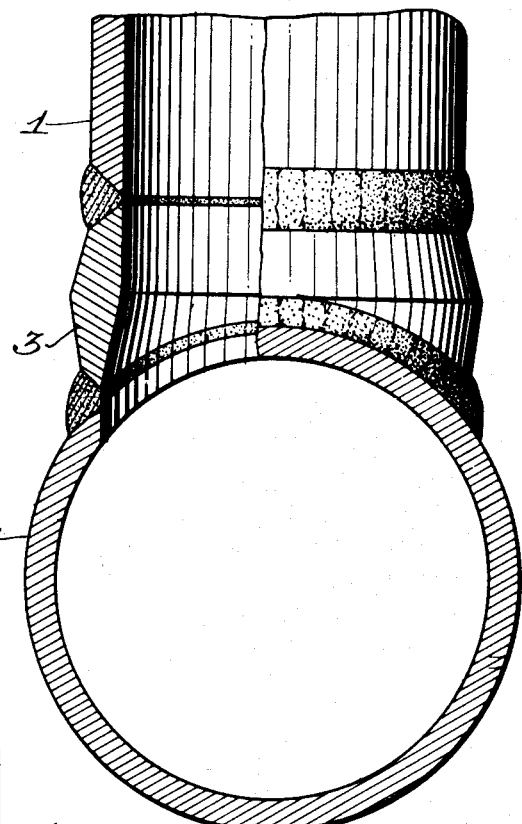
Fig. 4 is a view similar to Fig. 2 subsequent to the welding operation.

For the purpose of illustrating my invention, I have shown in Figs. 2 to 5, inclusive, of the drawings portions of two pipes 1 and 2 which are to be connected at an angle, the pipe 1 in the present instance, but not necessarily, being somewhat smaller than the pipe 2. In accordance with my invention, I provide a fitting 3, one end of which, designated by the reference numeral 4, is in the form of a saddle neatly fitting over the entire peripheral portion against the side of the pipe 2, while the other end which in the present instance lies in a plane normal to the longitudinal axis of the fitting has the same internal diameter as the pipe 1 and in assembly forms an abutment for the end of the latter. The interior surface of the fitting 3 is funneled and may intersect the outer surface of the fitting at each end in a sharp edge, although it is preferred to leave at each end of the fitting a narrow terminal surface, 5 and 6 respectively. The surface 6 is particularly desirable as affording a seat for the end of the pipe 1, which somewhat facilitates positioning of the latter for the welding operation. It will be noted that with the inner and outer surface formations of the fitting 3 illustrated in the drawings, the wall of the fitting in effect tapers towards both ends, and that the original contact between the fitting and the pipes 1 and 2 is confined to a line or to a relatively restricted surface area, while the immediately adjacent portions of the walls of the fitting are relatively thin. It will be noted further that the beveled outer faces 7 and 8 of the fitting 3 form with the adjacent surfaces of the pipes 1 and 2 angles which in effect provide craters extending continuously along and co-extensive with the meeting lines of the fitting with the pipes 1 and 2 within which metal in the fused state is deposited in the welding operation. In the accepted practice, the most favorable angle for this crater has been fixed at around 90°, and it is accordingly preferable to bevel that end of the pipe 1 which abuts the fitting, as indicated at 9, in order to provide a crater at this point approximating the stated angle.

Figure 5:
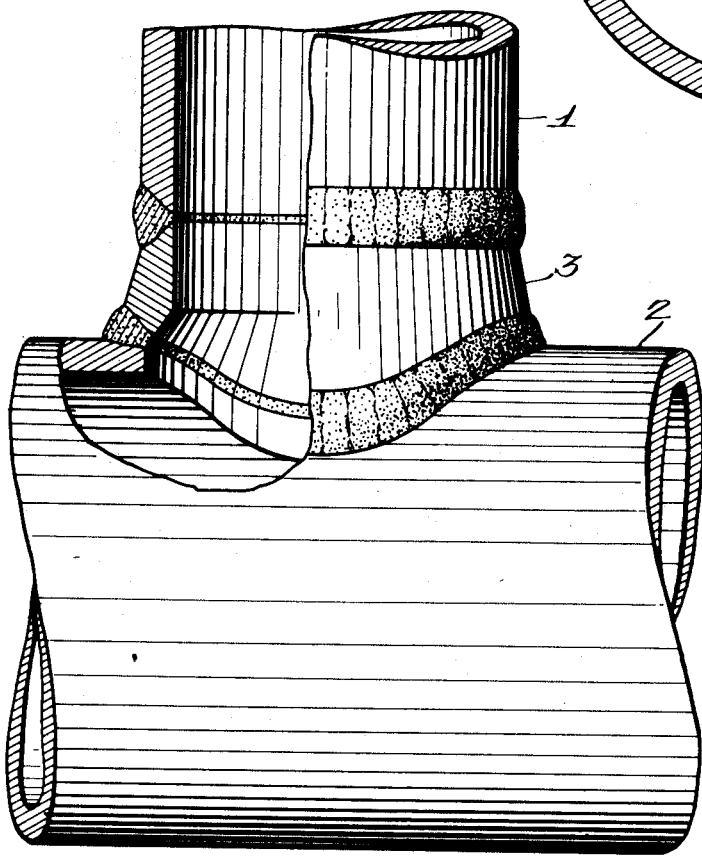
Fig. 5 is a view similar to Fig. 3 subsequent to the welding operation.

In practice, I prefer to assemble the fitting 3 with the pipe 2 as illustrated in Figs. 2 and 3 without previously forming in the said pipe 2 the opening through which communication is to be established with the fitting 3 and subsequently with the pipe 1. The fitting is then welded to the pipe 2, as illustrated in Figs. 4 and 5, gas welding being preferred. In this welding operation, the relatively thin base wall or apron is heated to or near the fusion point, as also is an adjacent portion of the pipe 2, simultaneously with deposition along the crater line of fused metal, the metal of the pipe and the metal of the fitting 3 fusing with the deposited metal and forming at the junction a homogeneous mass affording a joint of great strength and solidity. Following completion of this welding operation, that portion of the pipe 2 embraced by the inner wall of the fitting 3 is cut away by means of a torch or by any other suitable means to thereby establish a clean opening connecting the interior of the fitting 3 with the pipe 2. The pipe 1 is now placed in position at the outer end of the fitting 3, as illustrated in Figs. 2 and 3, and these parts welded together, the welding area embracing portions of the abutting ends of the fitting 3 and the pipe 1 and the metals being fused together in a homogeneous mass after the manner previously described and as illustrated in Figs. 4 and 5.

The resulting union between the pipes 1 and 2 through the medium of the fitting 3 is an extremely rugged one, in which the metals of the various parts are actually fused together so as to form in effect an integral homogeneous structure, the interior passages through the connected parts being smooth and substantially free from protuberances adversely affecting the efficient flow of a fluid through the pipes, and from one pipe to the other.

The material advantages to be derived from my invention will be more readily understood by a consideration of the prior methods of uniting pipes by welding operations. In these prior methods in which one pipe was welded in direct abutment with the other, it was necessary to correspondingly form the opening in the side of the one pipe and the end of the other pipe by means of templates, the actual cutting away of the pipes being usually accomplished by means of burning with a suitable torch. The edges of the two pipes at the line of juncture accordingly were rough and uneven and the junction irregular and imperfect. The actual welding operation was thus rendered extremely difficult and required the services not only of an expert welder but of an assistant to hold the pipes in position during at least an initial portion of the welding operation. By reason of the irregularities at the junction line of the two pipes, the welding operation frequently resulted in the production of extended protuberances on the inside of the junction which, projecting into the pipe channels, obstructed the flow of fluid through the pipes. A union so formed was also relatively undesirable by reason of the sharp interior corner where the two pipes came together, which with the aforesaid protuberances created turbulence and "friction" at the point of flow from one pipe to the other.

In practicing my invention it is entirely possible for a welder to perform the welding operation without assistance, the saddle fitting 3 forming neat joints with the pipes 1 and 2 and the parts being readily held in their proper relative positions for the welding operation. The character of the weld is such as to largely prevent the formation of undue protuberances at the inner side of the weld which, as previously set forth, adversely affect the efficiency of the conduit. By forming the fitting 3 as described above with the substantially funnel-shaped interior and the tapered ends, an extremely strong weld is obtainable with a relatively smooth interior channel substantially free from sharp or right angled corners, a feature of substantial superiority over the screwed fitting commonly employed.

Another advantage accruing to my invention resides in the fact that the fitting 3 may be readily formed by forging, and is therefore available for use in wrought iron pipe systems. Heretofore forged fittings have been confined largely to T's, L's or the like produced as a solid body and drilled or bored to afford the interior passages of desired dimensions, such fittings being assembled in the pipe lines by screwed connections. Aside from the relatively high cost of such fittings, they were relatively undesirable by reason of the restriction at the point where the interior channels intersect. My invention provides a relatively inexpensive forged fitting free from the aforesaid structural disadvantage by reason of the funneled formation which affords an enlarged aperture at the point of flow from one pipe to the other.

Figure 6:
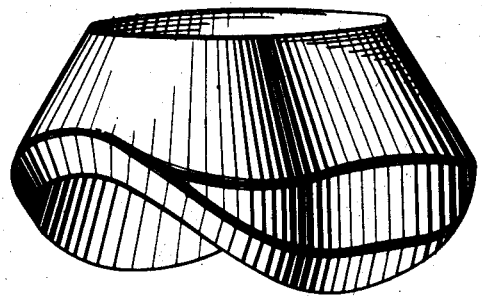
Fig. 6 is a view in perspective of a fitting made in accordance with my invention and adapted particularly for connecting pipes of the same diameters.
Figure 7:
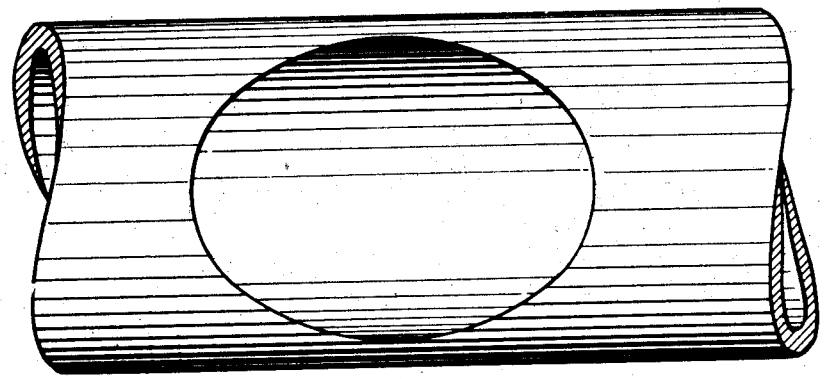
Fig. 7 is a view of a section of pipe illustrating the principle involved in connecting pipes of certain relative sizes, as hereinafter set forth.

As illustrated in Figs. 6 and 7, a fitting made in accordance with my invention is readily adaptable to the uniting of pipes of the same or differing diameters, and even to joining a pipe of one diameter to the side of a pipe of lesser diameter without loss of capacity by reason of restriction at the point of communication. Where the branch pipe is of smaller diameter than the pipe to which it is to be connected, the opening in the side of the latter pipe will tend in a preferred embodiment to be of substantially elliptical form, the longer axis of the ellipse normally extending transversely of the said larger pipe. In the event that a pipe of larger diameter is joined to the side of one of lesser diameter, the side opening in the one may again take a preferably generally elliptical form with the longer axis extending longitudinally of the pipe, as shown in Fig. 7, in order to avoid restriction of the interior chamber where the pipes unite. The fitting shown in Fig. 6 is adapted for uniting pipes of the same diameter, the opening in the side of the one pipe in this instance preferably approaching a circle. A feature of the invention therefore resides in its adaptability in connecting pipes of different or the same sizes without restriction at the point of juncture.

Figure 8:
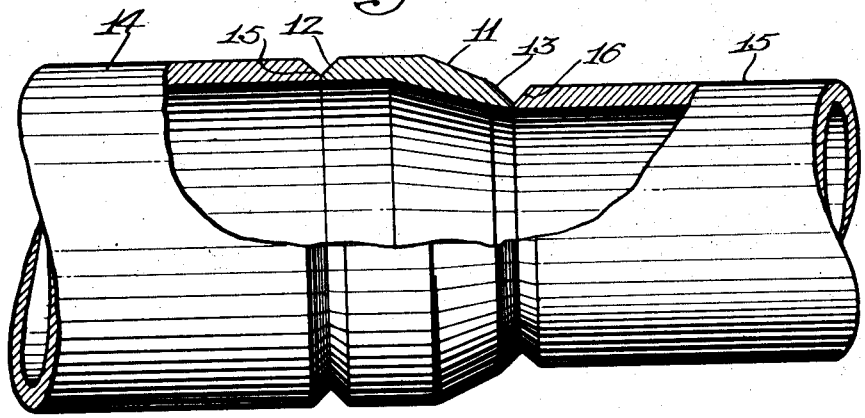
Fig. 8 is a view, sectional in part, illustrating a fitting incorporating some of the principles of my invention and useful for connecting the ends of pipes of different diameters.

The fitting 3 may be materially modified as to form to meet various conditions of use or to adapt it to particular forms or types of welding without departure from the essential principles of the invention as defined in the appended claims. Thus in Fig. 8, I have illustrated a fitting embodying certain of the essential features of my invention and adapted for connecting end to end pipes of different diameters. In this instance, the welding union 11 has the characteristic funneled interior, the relatively thin extremities, and the beveled surfaces 12 and 13 which provide the circumferential craters required for efficient welding. In this instance also, the ends of the united pipes 14 and 15 are also beveled as indicated at 15 and 16 to afford a crater angle of maximum efficiency.

In Figs. 9, 10 and 11, a modified form of welding union is illustrated which while generally not as desirable as the embodiment illustrated in Figs. 1 to 6, inclusive, may be found best suited for certain types of connection and also well adapted to electric welding. In this instance, the welding union 17 is formed with a saddle-shaped terminal surface 18 of considerable width, this surface in assembly and as illustrated in Fig. 10 resting throughout its entire area against the side of the pipe 19, from which the branch is to extend. A relatively extended contact area between the welding union 17 and the pipe 19 is thus afforded. As illustrated in Fig. 11, the fitting 17 is in this instance adapted to be secured to the pipe 19 by means of a fillet weld 21 extending around the entire circumference of the fitting. At the points designated 22, that end of the fitting which engages the pipe 19 is scarfed or beveled to provide a crater angle between the fitting and the said pipe more favorable to an efficient weld. In this instance also, the opening 23 in the side of the pipe 19 may be formed either before or after the welding operation, although as previously set forth, it is preferred to form this opening subsequent thereto. The outer end of the fitting 17 is preferably provided with a characteristic beveled surface 24 and a flatted terminal surface 25 for the purposes previously set forth.

It is to be noted also that a fitting made in accordance with my invention may constitute an integral part of the pipe 1, and that for welding purposes the pipes may be produced with the fitting associated therewith either as an integral part or welded thereto as herein described. It is to be noted further that the utility of my invention is not restricted to uniting pipes or tubes, since it will in principle be found of advantage in uniting rods and other solid forms by welding.

I claim:

1. In means for joining a tubular element by welding with the sides of another tubular element, a tubular fitting having a funneled interior bore merging into a cylindrical interior bore, the exterior surface of said fitting converging in opposite directions from a point substantially in the plane of the juncture between the funneled and cylindrical bores in the fitting, whereby relatively thin terminal welding portions and maximum thickness of the fitting at the point of greatest stress are provided.

2. In means for joining a tubular element with the sides of another tubular element, a tubular fitting having a funneled interior bore merging into a cylindrical bore, the exterior surface of said fitting converging from a point substantially in the plane of the juncture between the said funneled and cylindrical bores toward that end of the fitting containing the funneled bore, whereby to form at that end a relatively thin terminal welding portion, while maintaining a maximum thickness of the fitting at the point of greatest stress.

3. In means for joining a tubular element by welding with the sides of another tubular element, a substantially cylindrical tubular fitting having a funneled interior bore merging into a cylindrical interior bore, the wall of said fitting gradually diminishing in thickness from an intermediate plane toward that end of the fitting containing the funneled bore, whereby to form at that end a relatively thin terminal welding portion, while maintaining a maximum thickness of the fitting at the point of greatest stress.

4. In means for joining a tubular element by welding with the sides of another tubular element, a substantially cylindrical tubular fitting having a funneled interior bore merging into a cylindrical interior bore, the wall of said fitting gradually diminishing in thickness from an intermediate plane toward the opposite ends of the fitting, whereby relatively thin terminal welding portions and maximum thickness of the fitting at the point of greatest stress are provided.

FRED S. DURHAM.